(12) United States Patent
Becker et al.

(10) Patent No.: US 8,630,805 B2
(45) Date of Patent: Jan. 14, 2014

(54) METHODS AND SYSTEMS FOR CREATING MAPS WITH RADAR-OPTICAL IMAGING FUSION

(75) Inventors: Jan Becker, Palo Alto, CA (US); Oliver Schwindt, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/277,860

(22) Filed: Oct. 20, 2011

(65) Prior Publication Data

US 2013/0103301 A1 Apr. 25, 2013

(51) Int. Cl.
  *G01C 21/30* (2006.01)
  *G01C 21/34* (2006.01)
  *G01C 21/36* (2006.01)

(52) U.S. Cl.
  USPC ............ 701/514; 701/17; 701/28; 701/409; 701/412; 701/523; 342/179; 342/357.22; 342/357.24; 342/357.39; 342/357.44; 342/357.64; 342/357.72; 342/357.73

(58) Field of Classification Search
  CPC ........ G01C 21/30; G01C 21/34; G01C 21/36; G01C 21/3602; G01C 22/00
  USPC .................. 701/409, 412, 514, 523
  See application file for complete search history.

(56) References Cited

U.S. PATENT DOCUMENTS

| | | | |
|---|---|---|---|
| 6,898,518 B2 * | 5/2005 | Padmanabhan | 701/409 |
| 7,202,776 B2 * | 4/2007 | Breed | 340/435 |
| 7,983,802 B2 * | 7/2011 | Breed | 701/1 |
| 8,026,929 B2 * | 9/2011 | Naimark | 345/629 |
| 8,116,928 B2 * | 2/2012 | Wu et al. | 701/23 |
| 8,422,825 B1 * | 4/2013 | Neophytou et al. | 382/294 |
| 2005/0255842 A1 * | 11/2005 | Dumas et al. | 455/424 |
| 2008/0074312 A1 * | 3/2008 | Cross et al. | 342/25 A |
| 2010/0026809 A1 * | 2/2010 | Curry | 348/157 |
| 2010/0045513 A1 | 2/2010 | Pett et al. | |
| 2011/0010676 A1 * | 1/2011 | Khosravy et al. | 715/863 |
| 2011/0103651 A1 * | 5/2011 | Nowak et al. | 382/106 |
| 2013/0222375 A1 * | 8/2013 | Neophytou et al. | 345/419 |

OTHER PUBLICATIONS

S. Clark et al., "Simultaneous Localisation and Map Building Using Millimetre Wave Radar to Extract Natural Features," Proceedings of the IEEE International Conference on Robotics and Automation, Detroit, Michigan, May 1999 (6 pages).

Udo Frese, "A Discussion of Simultaneous Localization and Mapping," Autonomous Robots, dated Feb. 3, 2006 (18 pages).

Patrick Pfaff et al., "Towards Mapping of Cities," Proceedings of the IEEE International Conference on Robotics and Automation (ICRA), 2007, Rome, Italy (7 pages).

(Continued)

*Primary Examiner* — Mary Cheung
*Assistant Examiner* — Atul Trivedi
(74) *Attorney, Agent, or Firm* — Michael Best & Friedrich LLP

(57) ABSTRACT

A method of mapping a space using a combination of radar scanning and optical imaging. The method includes steps of providing a measurement vehicle having a radar system and an image acquisition system attached thereto; aligning a field of view of the radar system with a field of view of the image acquisition system; obtaining at least one radar scan of a space using the radar scanning system; obtaining at least one image of the space using the image acquisition system; and combining the at least one radar scan with the at least one image to construct a map of the space.

24 Claims, 3 Drawing Sheets

(56) References Cited

OTHER PUBLICATIONS

Franck Gerossier et al., "Trajectory-oriented EKF-SLAM using the Fourier-Mellin Transform applied to Microwave Radar Images," published at the 2009 IEEE/RSJ International Conference on Intelligent Robots and Systems, Oct. 11-15, 2009 (7 pages).

John Mullane et al., "Evidential versus Bayesian Estimation for Radar Map Building," School of Electrical & Electronic Engineering Nanyang Technological University Singapore, available as early as Oct. 19, 2011 (8 pages).

David M. Cole et al., "Using Laser Range Data for 3D Slam in Outdoor Environments," Oxford University Robotics Research Group Department of Engineering Science, Oxford, United Kingdom, available as early as Oct. 20, 2011 (8 pages).

International Search Report and Written Opinion for Application No. PCT/US2012/060954 dated Jan. 20, 2013 (13 pages).

Basarke, C. et al., "Team CarOLO," DARPA Urban Challenge 2007, Nov. 20, 2007, 24 pages, retrieved from the Internet <URL: http://archive.darpa.mil/grandchallenge/Techpapers/CarOLO.pdf>.

Form, T. et al., "Caroline—Ein autonom fahrendes Fahrzeug im Stadtverkehr," Proceedings Des 8. Braunschweiger Symposiums Automatisierungssysteme, Assistenzsysteme Und Eingebettete Systeme Fur Trasportmittel, Feb. 1, 2007, 38 pages.

Rauskolb, F. et al., "Caroline: An Autonomously Driving Vehicle for Urban Environments," Journal of Field Robotics, Aug. 25, 2008, vol. 25, No. 9, pp. 672-724.

\* cited by examiner

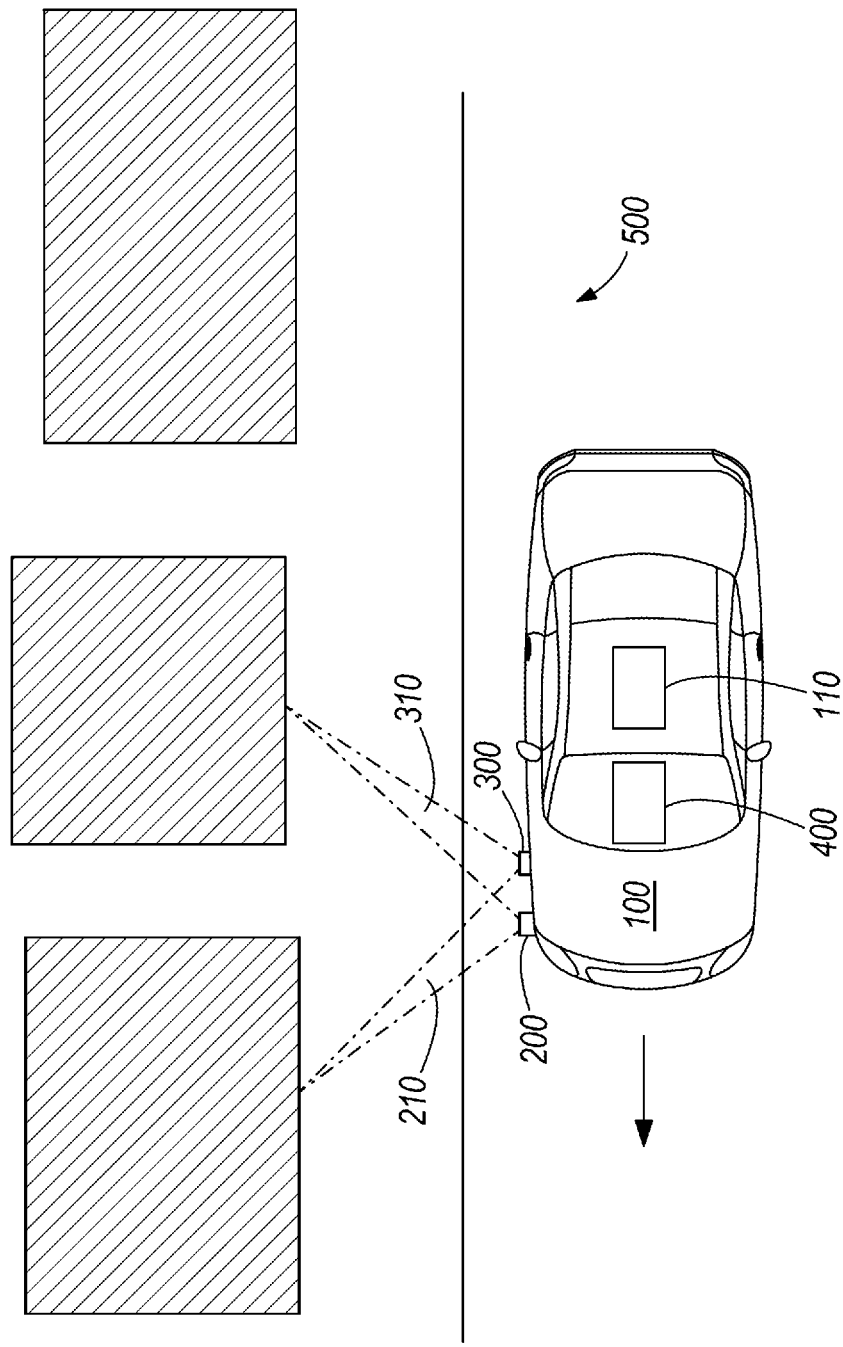

METHODS AND SYSTEMS FOR CREATING MAPS WITH RADAR-OPTICAL IMAGING FUSION

BACKGROUND

The present invention relates to creating maps using a combination of radar data and optical image data.

While vehicle-based mapping is known, current methods suffer from a number of drawbacks including poor angular resolution or inexact spatial measurements.

SUMMARY

In one embodiment, the invention provides a method of mapping a space using a combination of radar scanning and optical imaging. The method includes steps of providing a measurement vehicle having a radar system and an image acquisition system attached thereto; aligning a field of view of the radar system with a field of view of the image acquisition system; obtaining at least one radar scan of a space using the radar scanning system; obtaining at least one image of the space using the image acquisition system; and combining the at least one radar scan with the at least one image to construct a map of the space.

In another embodiment the invention provides a system for mapping a space using a combination of radar scanning and optical imaging. The system includes a measurement vehicle having a radar system and an image acquisition system attached thereto, a field of view of the radar system being aligned with a field of view of the image acquisition system. The system also includes a controller in communication with the radar system and the image acquisition system. The controller is configured to obtain at least one radar scan of a space using the radar scanning system; obtain at least one image of the space using the image acquisition system; and combine the at least one radar scan with the at least one image to construct a map of the space.

Other aspects of the invention will become apparent by consideration of the detailed description and accompanying drawings.

BRIEF DESCRIPTION OF THE DRAWINGS

FIG. 1 shows a measurement vehicle scanning a space using a radar system and an image acquisition system along with a map of the space created from the scanned data.

DETAILED DESCRIPTION

Figure 3:
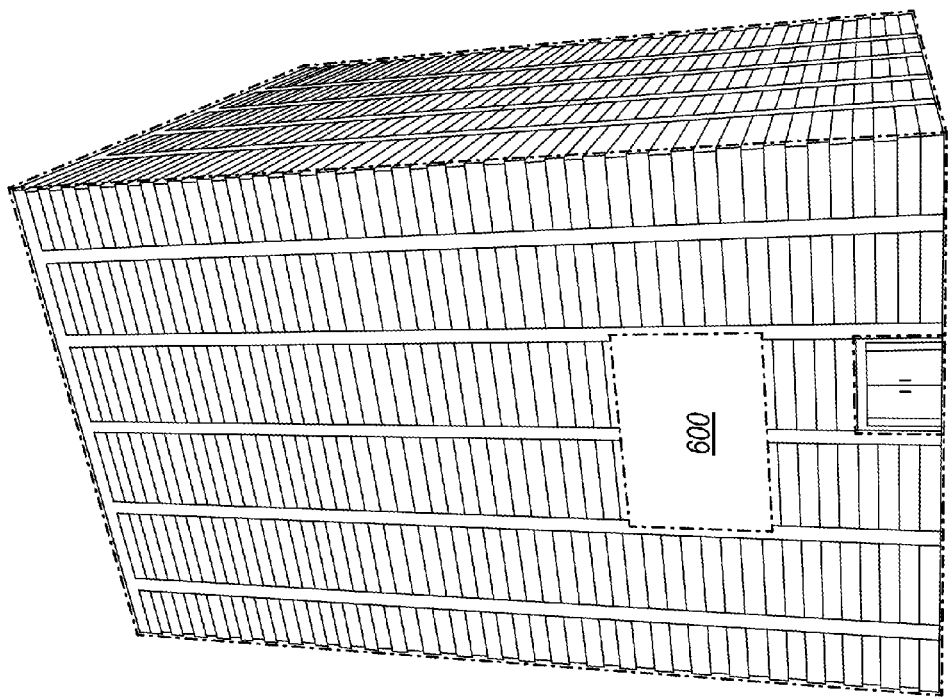
FIG. 3 shows a building as seen in a typical image as would be viewed by the image acquisition system, in which parallel features in the building appear to be converging or diverging due to the transformation of the three-dimensional building to a two-dimensional image.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

The invention includes methods and systems for creating maps by combining information from radar scanning and optical image acquisition. A measurement vehicle 100 is navigated through a space, collecting one or more radar scans and optical images of the space. The space is any location where a detailed three-dimensional view of an area is desired, such as of buildings in an urban environment.

In various embodiments, the measurement vehicle 100 is a conventional vehicle such as a car, truck, van, or motorized cycle. In other embodiments, the measurement vehicle 100 is an autonomous or remotely-operated vehicle such as a robot. In various embodiments, the measurement vehicle 100 is an autonomous, remotely operated, or piloted land-based, aerial, or aquatic vehicle.

In embodiments of the invention, the measurement vehicle 100 has a radar system 200 and an image acquisition system 300 attached thereto (FIG. 1). Each of the radar system 200 and the image acquisition system 300 has a respective field of view 210, 310, which corresponds to the region of space that each obtains information. For simplicity, FIG. 1 shows a single radar system 200 and image acquisition system 300, however, in various embodiments multiple units may be attached to the measurement vehicle. The use of two or more image acquisition systems 300 provides the ability to capture stereo images, thereby allowing additional data to be obtained from the images.

In one embodiment, the fields of view 210, 310 for the two systems are aligned such that both systems are collecting data from the same region of space at the same time. The radar system 200 and image acquisition system 300 may be pointed forwards, sideways, or backwards on the measurement vehicle 100. In various embodiments, the measurement vehicle 100 may also include a GPS unit 400.

The measurement vehicle 100 in various embodiments includes a computer system 110. In some embodiments, data from the radar system 200, the image acquisition system 300, and the GPS unit 400 (when present) is collected and stored using the computer system 110, which for illustration purposes is shown as being housed on the measurement vehicle 100. Nonetheless, the methods and systems described herein may be implemented using one or more such computer systems 110 operating in one or more remote locations. In general, the computer system 110 includes a microprocessor, memory and data storage, input and output, and wired or wireless networking capabilities and is in operative communication (wired or wireless) with the measurement and sensing systems disclosed herein. The computer system 110 serves as a controller which is configured to carry out the methods and systems disclosed herein, including controlling one or more of the radar system 200, the image acquisition system 300, and the GPS unit 400 and processing the data as described herein to map the space as disclosed herein.

In some embodiments the data is transmitted while being collected to a different site for storage and analysis, e.g. using radio-based communications, by a comparable computer system 110 that is remotely located. Data may be analyzed simultaneous with its collection (or near-simultaneous, using buffers to store data when the transmission signal is slowed or interrupted) or the data may be stored during collection on the computer system 110 and analyzed offline at a later time.

A fixed-beam radar system 200 can obtain information from a wider field of view by including a plurality of antennas positioned at different angles relative to one another to collect reflected radar energy from a number of directions, and to use information about the relative angles of the antennas to obtain spatial information from the reflected energy. Alternatively, a scanning radar system 200 can obtain information about spatial relationships of the reflected energy by scanning and collecting energy from what is typically a narrower field of view and building up a larger field of view by scanning the space (e.g. raster scanning).

Data from the radar system 200 provides accurate information about distances to objects in the field of view 210. However, compared to optical imaging, radar is not as accurate when providing angular information, e.g. information about dimensions that are normal to the radar beam. This is particularly the case with a fixed-beam radar system 200 where angular information is obtained the differential signals collected from the plurality of antennas which receive reflected energy.

Therefore, to provide better spatial information across the field of view 210 of the radar system 200 (i.e. better angular resolution), the radar scan information is combined with one or more images obtained of the same space using the image acquisition system 300. As noted above, the radar system 200 and the image acquisition system 300 are aligned at the outset in order to make the fields of view overlap as accurately as possible. Nevertheless, further alignment of the data may be necessary and can be performed either manually or in an automated manner.

The radar sensor 200 generally collects raw-frequency information. Typically, a Fourier transformation is performed on the raw-frequency information. Since the reflections from moving objects (e.g. cars, pedestrians) are substantially less than from stationary objects (e.g. buildings, posts), it is generally safe to assume that all of the reflection data is from objects that are stationary. Therefore, the result of the Fourier transformation of the raw-frequency information will correspond to distances from the radar sensor of stationary objects. Nevertheless, to better refine the data and particularly for situations in which moving objects make a significant contribution to the reflection data, the components of the data from the moving objects can be determined and removed when a map is being constructed. In addition, velocity information from the radar sensor 200 can be analyzed at a later time and data corresponding to moving objects can be removed.

For each frequency, an angle can be calculated, where the mechanism for calculating the angle being dependent on whether a fixed-beam or a scanning radar sensor 200 is used. For a fixed-beam sensor, for each frequency, the phase and amplitude information from the different antennas are compared to determine the angle whereas a scanning sensor gives more direct results about angles. Once all of this information has been calculated, a map is produced, where the calculated angles for each distance are marked. The received power information from the radar sensor 200 can also be used to distinguish well-measured from poor measurements. While in some cases the radar map contains noise, in general the radar map provides outlines or silhouettes which correspond to buildings or other large, stationary objects.

Figure 2:
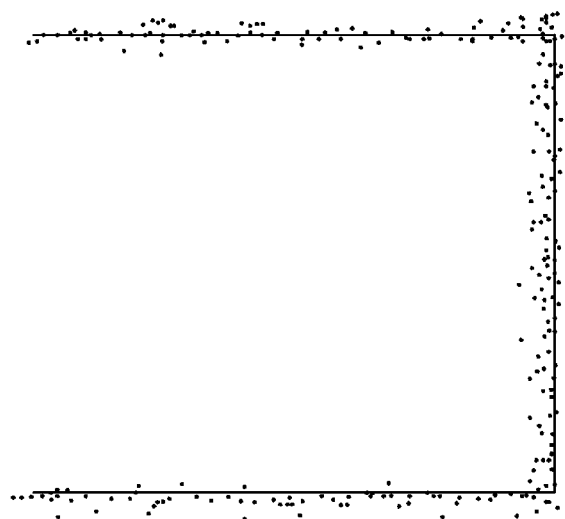
FIG. 2 shows a diagram that was generated using radar data to identify the perimeter of a building.

FIG. 2 shows a diagram that was generated using radar data to identify the perimeter, or footprint, of a building, e.g. the building shown in FIG. 3. FIG. 2 shows a view of the footprint of a building, seen from above, showing the radar data (speckles in FIG. 2), namely an abstracted, or condensed, view of the strongest summation of the radar reflections collected by the radar system 200. From this information, the outline of the building is identified (lines in FIG. 2).

Using data obtained from the image acquisition system 300 of the same location, the large objects that have been detected, e.g. the building in FIG. 2, can be identified. Image processing and object recognition can be used to identify these large objects, and for the objects of interest, a matching of the radar and video data can be performed. An exact distance to these objects can be determined, particularly using radar data, and entered into the map (e.g. as GPS coordinates).

For objects that are not of interest, classification of the objects using image data from the image acquisition system 300 can be used to exclude one or more such objects. For example, other vehicles (e.g. parked cars) could be identified and excluded for the mapping step, because these are typically movable and may not be at their original position anymore when the map is used.

Since the radar system 200 can also determine whether there are large free spaces between large objects such as buildings, locations such as alleyways can also be entered into the map, without having to move the measurement vehicle 100 through them; this is particularly useful if vehicles are not allowed in the alleyway or if the measurement vehicle 100 does not fit in the alleyway. A space such as an alleyway has the characteristics that it is bounded by long straight walls (i.e. the fronts of buildings) and an unobstructed view next to them (i.e. the opening corresponding to the alleyway).

Figure 4:
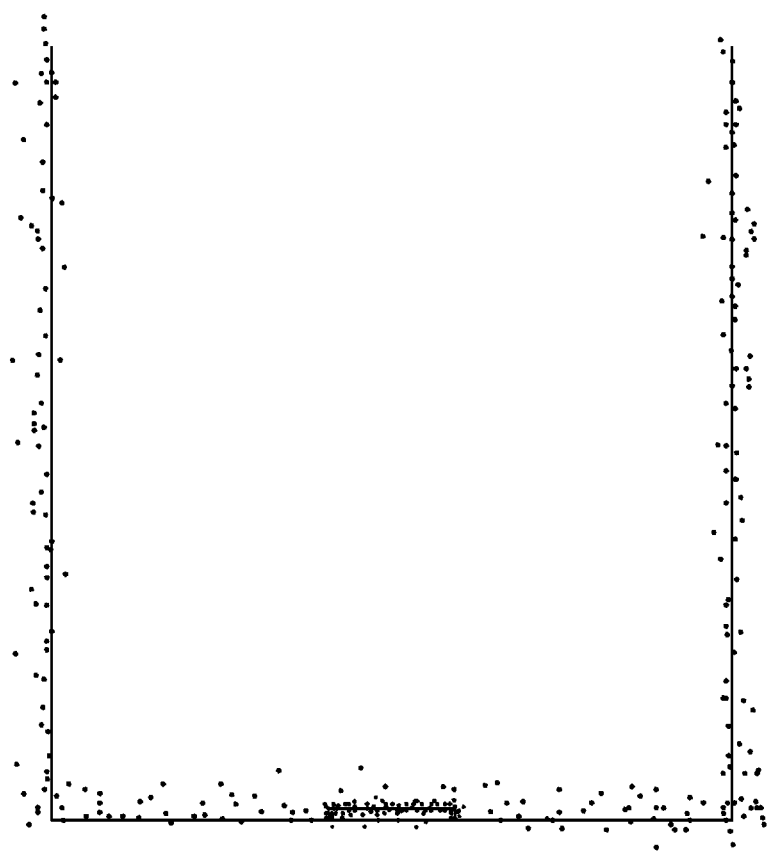
FIG. 4 shows a diagram that was generated using radar data depicting the perimeter of a building, where the location of a doorway has been identified based on information extracted from the related image data.

As a result of processing of the data from the radar system 200 and the image acquisition system 300, a map 500 of the space is generated with exact building positions (FIG. 1). In addition to the locations and dimensions of the bases of the objects, the map 500 can also include elevations of the front and sides of each object (and back side if accessible to the measurement vehicle 100) to provide a three-dimensional view. Accurate structural dimensions (e.g. width, height, distance from the street and other objects) obtained from the radar system 200 and the image acquisition system 300 can be used to define the outlines of structures such as buildings. This information in turn can be used to 'cut' data from the images that can be placed over the structurally-defined skeleton to produce a realistic three-dimensional view of the space. The image data can corrected for distortions which arise from the transformation of a three-dimensional object (e.g. a building) to a two-dimensional image (FIG. 3). For most buildings it is assumed that the overall shape is a rectangular prism, however, data from the radar system 200 and the image acquisition system 300 can be used to determine the shape of the building or other object and make appropriate adjustments when correcting for perspective distortions. Image data can be analyzed to identify features on the object, e.g. a doorway or windows on a building, to provide more detailed information for mapping. FIG. 4 shows a diagram that was generated using radar data depicting the perimeter of a building, where the location of a doorway has been identified based on information extracted from the related image data. In conjunction with geo-reference data obtained from the GPS unit 400, the doorway can be used as a navigation point, e.g. for calculating walking distance or nearest parking lot, or to determine a distance from a user's current location to the building entrance. Dimensions such as the height of buildings can be calculated by using the dimensions visible in the pictures, using the radar distance to the building base from the view-point where the data was taken, and using view-point scaling calculations.

Several steps are taken to identify the outline of an object such as a building, such as the outline shown around the building in FIG. 3. The ground-line of the building (e.g. FIG. 2) is identified as a rotational point in the pitch directions (taking into account the viewing-angle and associated scaling with distance). The vertical corners are identified as rotational points in the yaw direction. Radar data such as the speckled data shown in FIG. 2 is used to identify building boundaries (lines in FIG. 2), which in turn are used to calculate the rotational points such as pitch and yaw. These points can then be used for segmenting images. Among other uses, this segmentation information can be used to stretch images to generate a new viewpoint when no original image from that point of view is available, e.g. take an oblique image of the side of a building and stretch it to generate a point of view looking directly at the side of the building.

In addition to images from the original building, images such as advertisements 600 can also be placed over some or all of the building (FIG. 3). Furthermore, the images that are 'cut' and placed onto a building, i.e. images of the exterior of the building, can be selected from a number of images of the building, for example images with better lighting than was available when the simultaneous scan data was obtained. Images with new viewpoints can also be created, e.g. by 'stretching' image data from a side view to give the appearance of being viewed from the front of the building. Since the dimensions of the skeleton of the building or other objects are known in three dimensions, the images that are placed onto the outside surface of the object can be displayed correctly even when viewed from a variety of angles. In the case of a building that is not a rectangular prism, e.g. a building with a curve face, the image data is 'stretched' over the curved surface.

The map 500 and related three-dimensional data from the space can be used for a number of purposes. In one embodiment, the map 500 is used to provide a virtual world based on the space that is scanned, or a composite of several spaces to create a fictional virtual world. In another embodiment, the map is used as part of a navigational tool, e.g. in a vehicle, a computer, or a smart phone.

In addition to the scanned objects, other three-dimensional objects can be added to the views provided in the maps. As noted above, advertisements can be placed on objects in a seamless manner. Also, virtual characters can be shown entering the depicted buildings, e.g. for gaming, advertising, or internet-retail purposes.

Compared to systems that employ only imaging systems to generate data, radar has the advantages of providing accurate distance information as well as a longer useful range (250 meters for radar compared to 20-50 meters for imaging systems. Thus, distances to buildings can be calculated to provide mapping and direction information without the need for the measurement vehicle 100 to approach the buildings closer. Therefore, the distance that the measurement vehicle 100 needs to drive to map a particular space for mapping is reduced. Furthermore, buildings further away from a public street can now be mapped more precisely. Additionally, the distance to the doors of the building can be given, including features such as the calculation of how long it takes to walk from the parking spot to the door.

Thus, the invention provides, among other things, a method and system to create maps with radar-optical imaging fusion. Various features and advantages of the invention are set forth in the following claims.

What is claimed is:

1. A method of mapping objects in a space using a combination of radar scanning and optical imaging, comprising:
    providing a measurement vehicle having a radar system and an optical image acquisition system attached thereto;
    aligning a field of view of the radar system with a field of view of the optical image acquisition system;
    obtaining at least one radar scan of the space using the radar system;
    obtaining at least one image of the space using the optical image acquisition system;
    generating a three-dimensional digital rendering of the space, including objects located in the space, based at least in part on the at least one radar scan and the at least one image; and
    storing the three-dimensional digital rendering of the space to a memory.

2. The method of claim 1, further comprising:
    identifying data from at least one of the image of the space and the radar scan of the space, the data being associated with a moving object in the space that is moving when the radar scan and image of the space are obtained, and
    wherein generating the three-dimensional digital rendering of the space includes omitting the data associated with the moving object so that a digital rendering of the moving object is not included in the three-dimensional digital rendering of the space.

3. The method of claim 1, further comprising identifying an object in the space and identifying a feature of the object.

4. The method of claim 3, wherein the object is a building and further comprising identifying an outline of the building using the at least one radar scan.

5. The method of claim 4, wherein the outline includes a footprint of the building.

6. The method of claim 4, further comprising estimating a height of the building.

7. The method of claim 3, wherein the object is a building, and further comprising:
    displaying at least a portion of the three-dimensional digital rendering of the space, the displayed portion of the three-dimensional digital rending including the building; and
    superimposing an advertisement on an exterior of the digital rendering of the building, wherein the superimposed advertisement does not appear on the exterior of the building in the at least one image.

8. The method of claim 1, further comprising displaying at least a portion of the three-dimensional digital rendering of the space on a navigation system.

9. The method of claim 1, wherein providing a measurement vehicle having a radar system and an image acquisition system attached thereto further comprises providing a measurement vehicle having a radar system, an image acquisition system, and a GPS unit attached thereto.

10. The method of claim 1, further comprising:
    displaying at least a portion of the stored three-dimensional digital rendering of the space, wherein the displayed portion includes a building; and
    superimposing a feature on an exterior of the digital rendering of the building, wherein the superimposed feature does not appear on the exterior of the building in the at least one image.

11. The method of claim 10, wherein the superimposed feature includes at least one of text, an image, and an advertisement.

12. The method of claim 1, wherein the act of obtaining at least one image of the space using the optical image acquisition system including capturing at least one image of the space using a camera.

13. A system for mapping objects in a space using a combination of radar scanning and optical imaging, comprising:
    a measurement vehicle having a radar system and an optical image acquisition system attached thereto, a field of view of the radar system being aligned with a field of view of the optical image acquisition system;

a controller in communication with the radar system and the optical image acquisition system, the controller configured to obtain at least one radar scan of the space using the radar system;

obtain at least one image of the space using the optical image acquisition system;

generate a three-dimensional digital rendering of the space based at least in part on the at least one radar scan and the at least one image; and store the three-dimensional digital rendering of the space to a memory.

14. The system of claim 13, wherein the controller is further configured to:

identify data from at least one of the image of the space and the radar scan of the space, the data being associated with a moving object in the space that is moving when the radar scan and image of the space are obtained, and wherein the controller is configured to generate the three-dimensional digital rendering of the space by omitting the data associated with the moving object so that a digital rendering of the moving object is not included in the three-dimensional digital rendering of the space.

15. The system of claim 13, wherein the controller is further configured to identify an object in the space and the controller is further configured to identify a feature of the object.

16. The system of claim 15, wherein the object is a building and wherein the controller is further configured to identify an outline of the building using the at least one radar scan.

17. The system of claim 16, wherein the outline includes a footprint of the building.

18. The system of claim 16, wherein the controller is further configured to estimate a height of the building.

19. The system of claim 15, wherein the object is a building, and wherein the controller is further configured to:

display at least a portion of the three-dimensional digital rendering of the space, the displayed portion of the three-dimensional digital rending including the building; and superimpose an advertisement on an exterior of the digital rendering of the building, wherein the superimposed advertisement does not appear on the exterior of the building in the at least one image.

20. The system of claim 13, further comprising a navigation system configured to display at least a portion of the three-dimensional digital rendering of the space.

21. The system of claim 13, wherein the measurement vehicle further comprises a GPS unit attached thereto.

22. The system of claim 13, wherein the controller is further configured to:

display at least a portion of the stored three-dimensional digital rendering of the space, wherein the displayed portion includes a building; and superimposing a feature on an exterior of the digital rendering of the building, wherein the superimposed feature does not appear on the exterior of the building in the at least one image.

23. The system of claim 22, wherein the superimposed feature includes at least one of text, an image, and an advertisement.

24. The system of claim 13, wherein the optical image acquisition system includes a camera.

* * * * *